US009258754B2

(12) United States Patent
Pawar et al.

(10) Patent No.: US 9,258,754 B2
(45) Date of Patent: *Feb. 9, 2016

(54) APPARATUS AND METHOD FOR MULTIMODE DEVICE HANDOVER

(71) Applicant: Clearwire IP Holdings LLC, Bellevue, WA (US)

(72) Inventors: Hemanth Balaji Pawar, Herndon, VA (US); Krishna D. Sitaram, Chantilly, VA (US); Daniel Vivanco, Herndon, VA (US)

(73) Assignee: Clearwire IP Holdings LLC, Bellevue, WA (US)

( * ) Notice: Subject to any disclaimer, the term of this patent is extended or adjusted under 35 U.S.C. 154(b) by 322 days.

This patent is subject to a terminal disclaimer.

(21) Appl. No.: 13/793,122

(22) Filed: Mar. 11, 2013

(65) Prior Publication Data

US 2014/0024373 A1    Jan. 23, 2014

Related U.S. Application Data

(63) Continuation of application No. 12/760,987, filed on Apr. 15, 2010, now Pat. No. 8,396,039.

(51) Int. Cl.
*H04W 4/00* (2009.01)
*H04W 36/00* (2009.01)
(Continued)

(52) U.S. Cl.
CPC .............. *H04W 36/14* (2013.01); *H04W 36/30* (2013.01); *H04W 36/0083* (2013.01)

(58) Field of Classification Search
CPC .. H04W 36/14; H04W 36/30; H04W 36/0083
See application file for complete search history.

(56) References Cited

U.S. PATENT DOCUMENTS

| 5,452,471 | A | * | 9/1995 | Leopold et al. ................ 455/429 |
| 7,356,340 | B2 |   | 4/2008 | Hamilton ....................... 455/446 |
| 7,492,752 | B2 |   | 2/2009 | Harris et al. ................... 370/342 |

(Continued)

FOREIGN PATENT DOCUMENTS

WO    WO 2009/053933    4/2009

OTHER PUBLICATIONS

International Search Report and Written Opinion for PCT/US2010/040091 mailed Sep. 1, 2010, 15 pages.
(Continued)

*Primary Examiner* — Steven H Nguyen

(57) ABSTRACT

Systems and methods of operating multimode 3G/4G communications devices in an overlapping 3G/4G coverage area (e.g., WiMAX or LTE/CDMA EvDO) include determining if a number associated with temporarily-disabled sectors of an available sector set of the multimode device while the device is operational with a 3G base station is at least equal to a threshold number. If the number is at least equal to the threshold number, a scan for a sector in the 4G network to handover the operation of the multimode device from the 3G base station associated with the 3G coverage to a 4G base station associated with the 4G coverage is initiated. A scan for a fixed period of time for a new available sector in the 3G network to be added in the available sector set may be initiated; and, if a new available sector is added to the sector set, it may be redetermined if the number associated with the temporarily-disabled sectors is at least equal to the threshold number, before initiating the scan for a sector in the 4G network.

20 Claims, 3 Drawing Sheets

Figure 1:
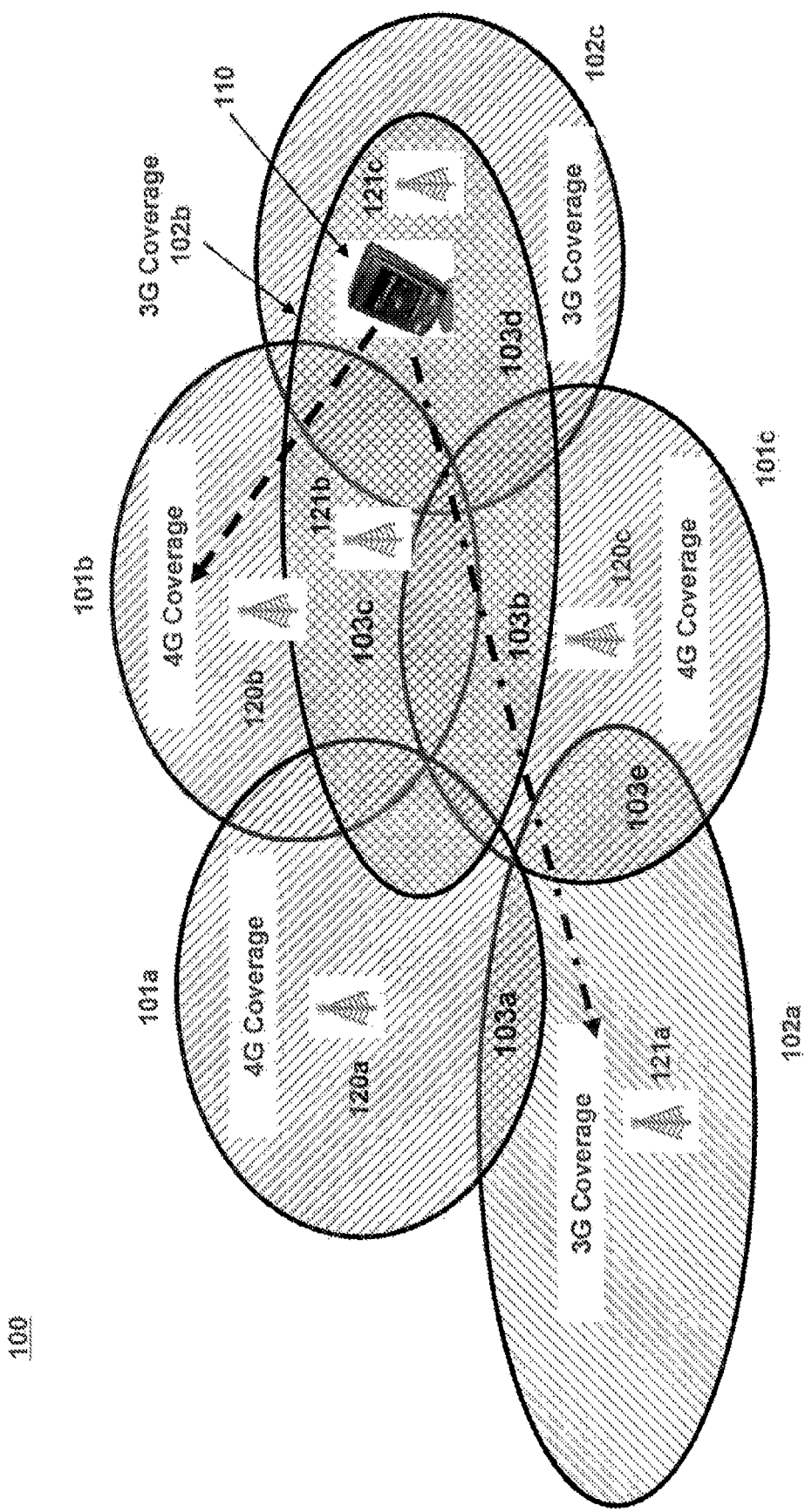

(51) Int. Cl.
*H04W 36/14* (2009.01)
*H04W 36/30* (2009.01)

(56) References Cited

U.S. PATENT DOCUMENTS

| | | | |
|---|---|---|---|
| 7,953,048 B2 * | 5/2011 | Yoon et al. | 370/335 |
| 8,285,291 B2 | 10/2012 | Dinan et al. | 455/443 |
| 8,396,039 B2 * | 3/2013 | Pawar et al. | 370/331 |
| 2004/0165563 A1 | 8/2004 | Hsu et al. | 370/338 |
| 2006/0092872 A1 | 5/2006 | Lee et al. | 370/328 |
| 2007/0042781 A1 * | 2/2007 | Yavuz et al. | 455/445 |
| 2007/0127407 A1 * | 6/2007 | Attar et al. | 455/69 |
| 2008/0076430 A1 | 3/2008 | Olson | 455/440 |
| 2008/0248800 A1 | 10/2008 | Jalloul | 455/433 |
| 2009/0052399 A1 | 2/2009 | Silver et al. | 370/331 |
| 2009/0067628 A1 | 3/2009 | Pudney et al. | 380/247 |
| 2009/0111458 A1 | 4/2009 | Fox et al. | 455/422.1 |
| 2009/0113543 A1 | 4/2009 | Adams et al. | 726/18 |
| 2010/0248708 A1 | 9/2010 | Koivisto et al. | 455/419 |
| 2010/0329181 A1 | 12/2010 | Lan | 370/328 |
| 2011/0189997 A1 | 8/2011 | Tiwari et al. | 455/443 |
| 2011/0255516 A1 | 10/2011 | Pawar et al. | 370/332 |
| 2013/0059591 A1 | 3/2013 | Tiwari et al. | 455/443 |

OTHER PUBLICATIONS

International Preliminary Report on Patentability for PCT/US2010/040091 mailed Nov. 30, 2011, 29 pages.

* cited by examiner

APPARATUS AND METHOD FOR MULTIMODE DEVICE HANDOVER

CROSS-REFERENCE TO RELATED APPLICATIONS

This application is a continuation of U.S. patent application Ser. No. 12/760,987 filed Apr. 15, 2010, now U.S. Pat. No. 8,396,039, the contents of which are hereby incorporated by reference in their entirety.

BACKGROUND

This disclosure is generally related to high speed wireless packet-based data networks and devices. In particular, this disclosure is related to multimode devices capable of operating in both third and fourth generation ("3G" and "4G") wireless networks. Examples of 3G wireless technologies includes Code Division Multiple Access (CDMA) and Evolution-Data Optimized or Evolution-Data only ("EvDO")/CDMA. Examples of 4G wireless technologies include Worldwide Interoperability for Microwave Access ("WiMAX") technologies and Long Term Evolution (LTE) technologies.

3G Networks

International Mobile Telecommunications-2000 (IMT-2000), better known as "3G" or 3rd Generation, is a family of standards for wireless communications defined by the International Telecommunication Union, which includes GSM EDGE, UMTS, and CDMA2000, as well as DECT. Services include wide-area wireless voice telephone, video calls, and wireless data, all in a mobile environment. Compared to earlier 2G and 2.5G services, 3G allows simultaneous use of speech and data services and higher data rates (up to 14.4 Mbit/s on the downlink and 5.8 Mbit/s on the uplink with certain enhancements). Thus, 3G networks enable network operators to offer users a wider range of more advanced services while achieving greater network capacity through improved spectral efficiency. Generally, 3G devices benefit from both a larger footprint coverage area, as well as national coverage.

EvDO

EvDO, or Evolution Data Only/Evolution Data Optimized, is a 3G mobile broadband technology used by various wireless carriers such as Verizon, Sprint, and Alltel that provides typical speeds of 600-1400 kbps download (with bursts up to 2000 kbps) and 500-800 kbps upload by wireless transmission. EvDO is a telecommunications standard for the wireless transmission of data through radio signals, typically for broadband Internet access. The resulting Internet connection may be shared with multiple computers using a 3G router, similar to a conventional broadband connection. It is standardized by 3rd Generation Partnership Project 2 (3GPP2) as part of the CDMA2000 family of standards, and has been adopted by many mobile phone service providers around the world—particularly those previously employing CDMA networks.

In a typical 3 G communication system including, e.g., an EvDO system, a base station (or an access node) transmits data to a device (or an access terminal), e.g., a dual-mode or multimode device, over a Forward Link (FL), and the device transmits data to the base station over a Reverse Link (RL). Data transmission, e.g., transmission of user traffic data, on the FL can occur from one base station to one device (on one sector) at or near the maximum data rate that can be supported by the FL and the communication system. Other broadcast channels of the FL (e.g., control channel) can be transmitted from multiple base stations to one device. Data transmission on the RL can take place from one device to one or more base stations.

Initially, the device and one of the base stations can establish a communication link using a predetermined access procedure. In this connected state, the device is able to receive data and control messages from that one base station. In the meantime, the device continually searches for other base stations that could be added to the device's active sector set which includes a list of the base stations having sectors (or frequencies) available for communication with the device. When such a base station is found as a candidate, the device calculates the quality of that base station's FL. For example, the quality of the FL of the candidate base station can be determined by a Signal-to-Noise Ratio (SNR) of a pilot signal of the candidate base station. At the same time, the device can calculate the FL quality for each base station already in the device's active sector set. Based on the calculated values, the candidate base station can be added or removed from the device's active sector set. In general, an "active set" is a set of frequencies available for use by the device. Thereafter, if a base station is selected from the active set based on a set a parameters, this base station is referred to as a serving base station. The set of parameters can include present and previous SNR measurements, a bit-error-rate, and other parameters known to one skilled in the art. For example, a base station may be selected in accordance with the largest SNR measurement.

In EvDO, the RL can be defined by an access channel and a traffic channel. The access channel is used by the device to establish connection with the base station, and this channel can be further defined by a pilot channel and a data channel. The traffic channel can comprise a primary and auxiliary pilot channels, a MAC channel, an acknowledgement (ACK) channel, and a data channel. Here, the MAC channel can be further defined by a reverse rate indicator (RRI) channel, a Data Rate Control (DRC) channel, and a data source control channel. Particularly, the device can transmit to the base station selected from the active set a DRC message on a DRC channel (of the RL channel) requesting data to be sent on a desired sector of the selected base station at a desired rate. The desired rate may be based on application priority or QoS requirements, or the user's subscribed data rate plan. The device can transmit a DRC message as often as once every 1.67 ms. There are 16 possible formats that the device may request from the selected base station, called "DRC indices." Each DRC index basically includes a specific set of parameters for transmission including a data rate, packet length, number of slots, coding rate, modulation type, preamble length, and repetition. The base station can then decide which transmission format to use considering the size of the packet, packet type (for single or multiple devices), quality of service (QoS), and requirements of other users active on the sector.

Further, in EvDO, the forward channels can be defined by time-division multiplexed (TDM) channels including a pilot channel, a Media Access Control (MAC) channel, a control channel, and a traffic channel. The MAC channel can be further defined by a reverse activity (RA) channel, a DRCLock channel, a reverse power control (RPC) channel, and an ARQ channel. In particular, the DRCLock channel allows a base station to inform a device if the base station will not continue to receive transmission requests on the device's DRC channel. For example, if a base station is included in a device's active set, the base station will continue to monitor the device's DRC channel for reliability and signal quality (e.g., based on an erasure rate of the DRC channel), and will set the values of DRCLock bits in a FL packet accordingly. For example, if the signal quality received by the base station is below a certain SNR value (or erasure rate is above a certain upper limit), the base station may set DRCLock bits to an "enable" state to indicate that the device should (temporarily) stop sending DRC requests to that base station, i.e., for a fixed (and configurable) period of time. In the meanwhile, the device may continue sending DRC requests to other base stations in its active sector set. Setting DRCLock bits in a particular way does not remove the base station from the active set of the device, but temporarily disables communication with the device. Also, the device may continually check if the DRCLock bits for a preferred base station in the active set have been unset (or set to "disable"), thereby again allowing the device to send DRC requests to the preferred base station.

4G Networks

International Mobile Telecommunications-Advanced (IMT Advanced), better known as "4G", "4th Generation", or "Beyond 3G", is the next technological strategy in the field of wireless communications. A 4G system may upgrade existing communication networks and is expected to provide a comprehensive and secure IP based solution where facilities such as voice, data and streamed multimedia will be provided to users on an "anytime, anywhere" basis, and at much higher data rates compared to previous generations. 4G devices provide higher speed and increased Quality of Service ("QoS") than their 3G counterpart devices.

WiMAX

One 4G technology, WiMAX 4G, is not yet fully deployed with ubiquitous coverage. However, multimode WiMAX 3G/4G devices are entering the market. For example, several multi-technology conventional devices exist that operate as multimode WiMAX/CDMA EvDO devices. Typically, 3G systems provide higher coverage footprint and national coverage, while 4G provides higher speed and improved QoS. As subscribers move about and roam between service areas, it is important that multi-technology handoff is implemented without incurring service interruption or performance degradation.

LTE

LTE is the project name of a high performance air interface for cellular mobile communication systems and is a step toward 4G radio technologies designed to increase the capacity and speed of mobile telephone networks. Where the current generation of mobile telecommunication networks are collectively known as 3G, LTE is marketed as 4G. However, it does not fully comply with the International Mobile Telecommunications (IMT) Advanced 4G requirements. Most major mobile carriers in the United States and several worldwide carriers have announced plans to convert their networks to LTE beginning in 2009. LTE is a set of enhancements to the Universal Mobile Telecommunications System (UMTS) which is introduced in 3rd Generation Partnership Project (3GPP) Release 8, with further enhancements in Release 9. These enhancements focus on adopting 4G mobile communications technology, including an all-IP flat networking architecture.

The LTE air interface, E-UTRA (Evolved UTRAN, the E-prefix being common to the evolved equivalents of older UMTS components) is used by UMTS operators deploying their own wireless networks. Release 8 was intended not just for use over E-UTRA, but may also be used over any other IP network, including WiMAX and WiFi, and even wired networks.

The E-UTRAN system uses Orthogonal Frequency-Division Multiple Access (OFDMA) for the downlink (tower to handset) and Single Carrier Frequency Division Multiple Access (SC-FDMA) for the uplink and employs Multiple-Input-Multiple-Output (MIMO) with up to four antennas per station. The channel coding scheme for transport blocks is turbo coding and a contention-free quadratic permutation polynomial (QPP) turbo code internal interleaver.

LTE's use of Orthogonal frequency-division multiplexing (OFDM), a system where the available spectrum is divided into many thin carriers, each on a different frequency and each carrying a part of the signal, enables E-UTRAN to be much more flexible in its use of spectrum than the older CDMA based systems that dominated 3G. CDMA networks require large blocks of spectrum to be allocated to each carrier, to maintain high chip rates, and thus maximize efficiency. Building radios capable of coping with different chip rates (and spectrum bandwidths) is more complex than creating radios that only send and receive one size of carrier, so generally CDMA based systems standardize both.

WiMAX and LTE have many similar features. For example, WiMAX utilizes CQI, throughput, CINR, and MIMO that are all present in LTE. One difference is in the naming convention used for MIMO in LTE. In LTE, downlink MIMO-A is called "downlink transmit diversity", and MIMO-B, as it is defined in WiMAX, is called Multi-User-MIMO (MU-MIMO).

Overlapping 3G/4G Coverage

Conventionally, multimode 3G/4G devices operating in an overlapping 3G (e.g., EvDO) and 4G (e.g., WiMAX or LTE) area choose to handover (or handoff) communication between 3G and 4G modes depending on radio frequency (RF) signal conditions such as received signal strength indication (RSSI) and carrier-to-interference noise ratio (CINR). More recent multi-technology handoff algorithms may also consider network loading as a triggering mechanism. Also, typically, multimode devices are configured to look for a sector in 4G network first. If a 4G sector is not available, then the device looks for a 3G network sector. If the 3G network sector is not available, then the device looks for a sector in the CDMA system. However, alternatively, multimode devices may be configured in such a way that if a multimode device is in communication with a 3G base station in the 3G network, e.g., receiving real-time multimedia data, it must stay in the 3G mode, even if 4G network is available for handoff. This may be done to avoid wastage of the device's processor time and battery power. In such a case, device performance and overall throughput depends, in part, on the number of sectors (or their respective base stations) in the device active set which have their DRCLock set, i.e., sectors which are temporarily disabled or unavailable to communicate with the device. For example, if there are M sectors in the active set for soft handoff in EvDO, and N out of the M (where N>0) sectors have set DRCLock bits (and are therefore unavailable), there is a realistic likelihood that the remaining M-N sectors may not be able to (or will not continue to) act as the serving sectors for the device if faced with deteriorating channel conditions, e.g., due to fast fading conditions. The remaining M-N sectors may also be removed from the active sector set if they fail to meet the device's active set signal strength criterion. Accordingly, this may lead to severe performance degradation (and possible complete service loss) and adversely affect user's experience, and the device will not be able to take full advantage of available 4G coverage.

What is needed is a system and method for a multimode 3G/4G device to proactively trigger a transition from 3G to 4G mode of operation in the case where a subset of sectors in the 3G active set of the multimode device become temporarily disabled or unavailable due to, e.g., setting of DRCLock bits by the 3G base stations. What is further needed is for the mode transition to be done in a manner that better utilizes scarce network resources and improves user satisfaction as compared to conventional multimode devices, when located in areas that provide equally acceptable 3G and 4G coverage.

SUMMARY

The apparatus and method of this disclosure provide various features, functions, and capabilities as discussed more fully in the detailed description. For example, this disclosure provides a novel and useful system and method for use in a communications system, with particular application in wireless telecommunication systems such as those adhering to IEEE 802.16 (Wireless Metropolitan Area Networks—WMAN), IEEE 802.16-2009 (fixed and mobile WiMAX), 3rd Generation Partnership Project (3GPP) Releases 8 and 9, and LTE-Advanced communication standard specifications and/or communication standards for CDMA, EvDO, WiMAX, and LTE. However, this disclosure is not necessarily limited to use with such systems and methods.

In one or more embodiments, this disclosure is directed to an apparatus and method useful for multimode device handover, for example, multimode "3G" and "4G" devices, referred to as multimode 3G/4G devices. More particularly, this disclosure is directed to an apparatus and method for multimode high-speed wireless packet-based 4G devices (e.g., LTE or WiMAX, collectively "4G device") and 3G CDMA devices, in particular, an apparatus and method for efficiently triggering handover between 3G and 4G modes in multimode 3G/4G devices to avoid device performance degradation and maintain user satisfaction, including multimode 3G/4G devices that operate in Evolution-Data Optimized or Evolution-Data only ("EvDO")/CDMA and WiMAX or LTE 4G overlay networks.

Various embodiments of this disclosure are useful to transition a 3G/4G multimode device (e.g., WiMAX/CDMA EvDO or LTE/CDMA EvDO) multimode device between networks when the device is operational in a 3G (e.g., CDMA EvDO) coverage area and would like to move to a 4G area (e.g., a WiMAX or LTE-only area), to a 4G and 3G (e.g., WiMAX/LTE and EvDO) overlay area, or to a 4G and CDMA overlay area.

The various embodiments disclosed herein generally may be realized by software enhancements to already existing dual-mode 3G/4G devices without requiring hardware modifications in the Radio Access Network (RAN).

In one or more embodiments of this disclosure, when a multimode device or mobile station (MS) is in communication with a 3G base station (BS) in a 3G network overlapping a 4G network (e.g., WiMAX, LTE, or a wireless IP packet-based network using an Orthogonal Frequency Division Multiple Access (OFDMA) modulation scheme), the multimode device determines if a handover to the overlapping 4G network be initiated based on a subset of temporarily-disabled or -unavailable sectors (e.g., sectors which have their DRCLock set by their respective 3G base stations) from its set of available (or active) 3G sectors. By proactively monitoring the state of the available sector set and determining, for example, if a number associated with the temporarily-disabled sectors (e.g., a ratio of the temporarily-disabled sectors to the total number of sectors in the available sector set) has reached a threshold, the multimode device is able to avoid performance degradation (or possible complete loss) of an existing communication by initiating handover to a sector on the 4G network before all the sectors in the 3G network become disabled or unavailable.

Systems and methods of this disclosure may be implemented such that a handover for a multimode device is initiated based on user priority determined by the rate plan and application Quality of Service (QoS). For example, a multimode device for a user paying for a higher plan or a multimode device supporting real-time applications (e.g., live video streaming) may be assigned higher priority for handover from the 3G network to the 4G network.

In one embodiment, a method of operating a multimode 3G/4 G communications device capable of operating in either a 4G network or a 3G network when in an area with overlapping 3G and 4G coverage includes determining, using a processor, if a number associated with temporarily-disabled sectors of an available sector set of the multimode device is at least equal to a threshold number, wherein the available sector set of the multimode device is stored in a memory operatively coupled to the processor, while the multimode device is operational with a 3G BS (e.g., CDMA EvDO BS) in the 3G network. If the number is determined to be at least equal to the threshold number, a scan for a sector in the 4G network is initiated to handover the operation of the multimode device from the 3G BS associated with the 3G coverage to a 4G BS (e.g., WiMAX BS or LTE BS) associated with the 4G coverage. The number associated with the temporarily-disabled sectors may be a ratio of a number of temporarily-disabled sectors of the available sector set to the total number of sectors in the available sector set. Responsive to the determination that the number is at least equal to the threshold number, before or in tandem with initiating the scan for a sector in the 4G network, the processor may be used to scan for a fixed time period for a new available sector in the 3G network to be added to the available sector set. If the scanning results in the addition of a new available sector to the available sector set, the processor may be used to redetermine if the number associated with the temporarily-disabled sectors of the available sector set is at least equal to the threshold number. The multimode device may be a dual-mode CDMA/EvDO-4G device, e.g., a dual-mode CDMA/EvDO-LTE device, or a dual-mode CDMA/EvDo-WiMax device.

In another embodiment, a multimode 3G/4 G communications apparatus capable of operating in either a 3G network or a 4G network when in an area with overlapping 3G and 4G coverage includes a 3G transceiver configured to transmit and receive information over a 3G network; a 4G transceiver configured to selectively transmit and receive data over a 4G network; a memory device configured to store an available sector set associated with the 3G transceiver, while the apparatus is in communication with a 3G base station in the 3G network; and a processor operatively coupled to the memory device, the 3G transceiver and the 4G transceiver. The processor may be configured to determine if a number associated with temporarily-disabled sectors in the available sector set is at least equal to a threshold number. If the number is determined to be at least equal to the threshold number, the processor enables control signals that initiate a scan for a sector in the 4G network and handover of communication of the multimode apparatus from the 3G base station associated with the 3G coverage to a 4G base station associated with the 4G coverage. The number associated with the temporarily-disabled sectors may be a ratio of a number of temporarily-disabled sectors of the available sector set to the total number of sectors in the available sector set. Responsive to the determination that the number is at least equal to the threshold number, before or in tandem with initiating the sector scan for sector in the 4G network, the processor may be further configured to enable control signals to scan for a fixed time period for a new available sector in the 3G network to be added in the available sector set of the 3G transceiver. If a new available sector is added in the available sector set, the processor may be further configured to redetermine if the number associated with the temporarily-disabled sectors of the available sector set is at least equal to a threshold number.

In another embodiment, a computer-readable medium comprises computer readable code physically embodied thereon which, when executed by a processor arranged in a multimode 3G/4 G communications device capable of operating in either a 4G network or a 3G network mode, causes the processor to carry out the functions of determining if a number associated with temporarily-disabled sectors of an available sector set of the multimode device is at least equal to a threshold number, and if so, initiating a scan for a sector in the 4G network to handover the operation of the multimode device from the 3G base station associated with the 3G coverage to a 4G base station associated with the 4G coverage. The available sector set may be stored in a memory operatively coupled to the processor, while the multimode device is operational with a 3G base station in the 3G network.

In another embodiment, a memory for storing data for access by an application program being executed by a processor in a multimode 3G/4 G communications system capable of operating in either a 4G network or a 3G network mode includes a data structure stored in the memory that includes information resident in a database used by the application program that includes an available sector set associated with a 3G aspect of the communication system in the 3G network mode and a threshold value of a number associated with temporarily-disabled sectors in the available sector set selected to initiate a scan for a sector to operate in the 4G network mode and to handover the communication in the communication system from the 3G network mode to the 4G network mode.

In another embodiment, a method of over-the-air provisioning of program functionality and data stored in a multimode 3G/4 G communications device capable of operating in either a 4G network or a 3G network mode includes sending program instruction updates to the multimode device over a communications link from a BS; sending data updates to the multimode device over the communications link from the BS while the multimode device is operational with a 3G base station in the 3G network; and storing the program instruction updates and the data updates in a memory in the multimode communications device. The program instruction updates include computer code that, when executed by a processor, determines if a number associated with temporarily-disabled sectors of an available sector set of the multimode device is at least equal to a threshold number, and if so, causes a scan for a sector in the 4G network and causes the multimode device to transfer communications from a 3G base station associated with the 3G coverage to a 4G base station associated with the 4G coverage. The data updates may include the available sector set of the multimode device and data relating to the threshold number.

BRIEF DISCUSSION OF THE DRAWINGS

Figure 2:
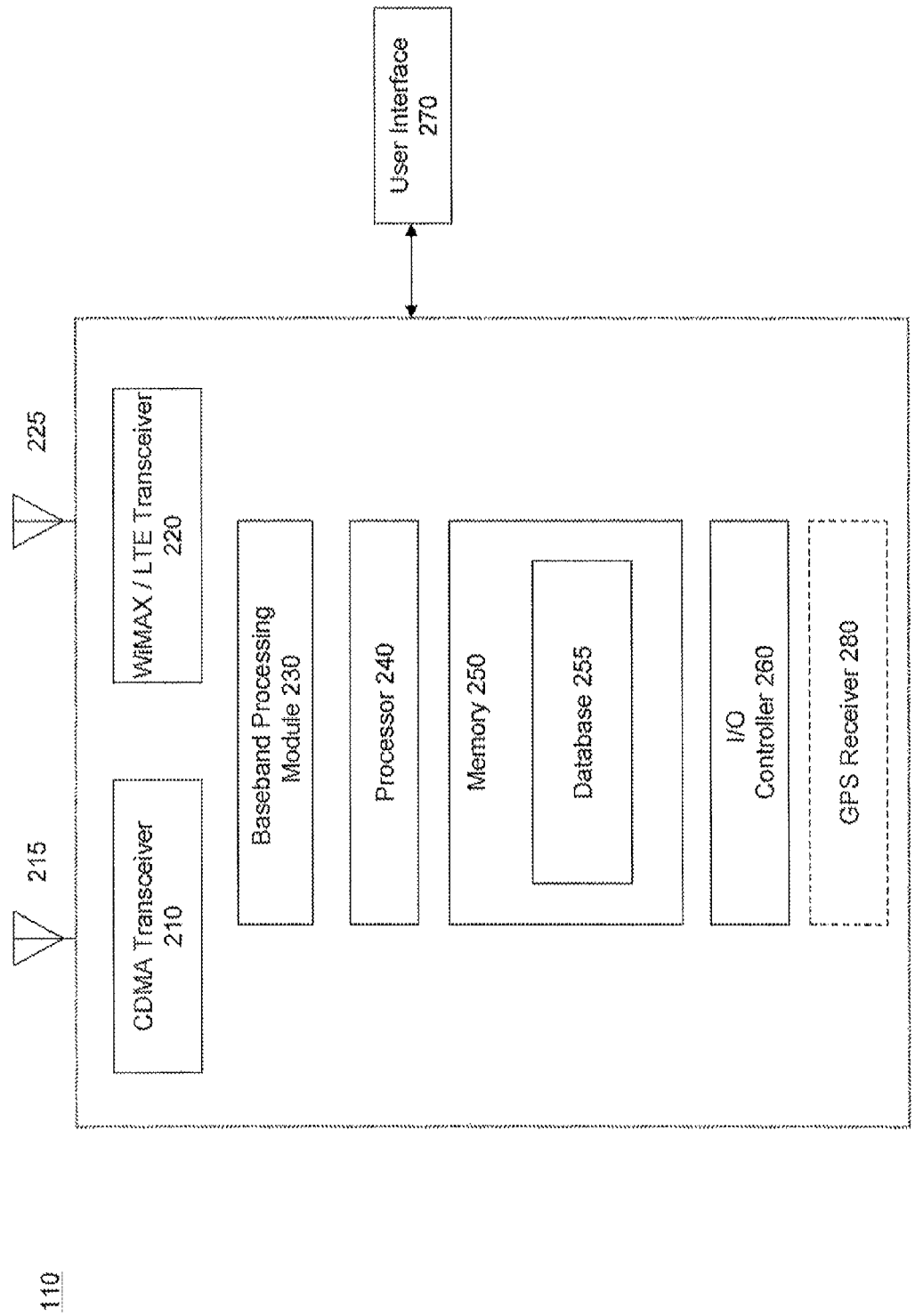
Figure 3:
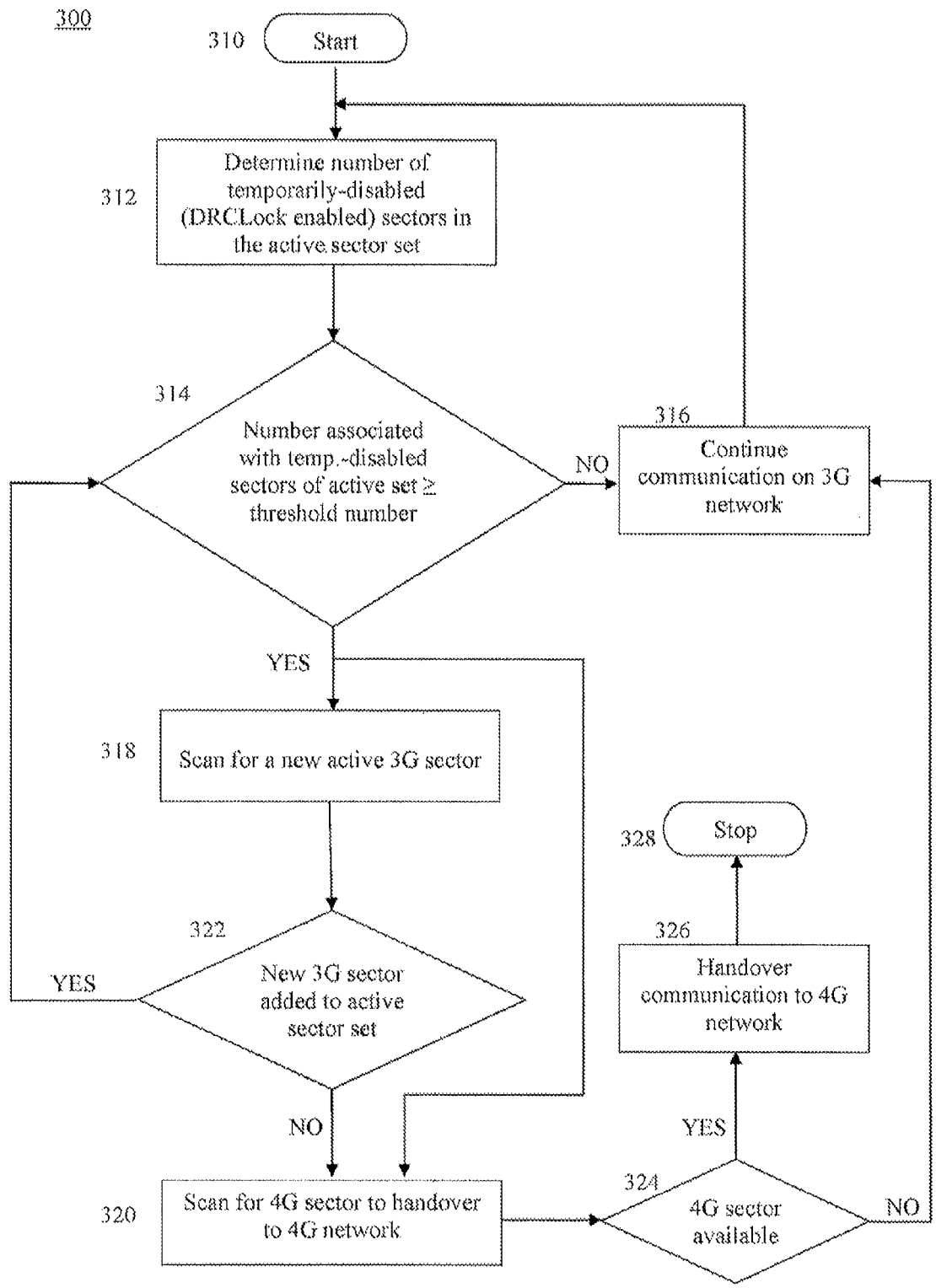

FIG. 1 provides a representation of a network arrangement having multimode 3G/4G devices operating therein;

FIG. 2 provides a block diagram of an exemplary embodiment of a multimode 3G/4G device, e.g., a CDMA/WiMAX or LTE device of this disclosure; and FIG. 3 provides an exemplary flowchart of a method of an embodiment of this disclosure.

DETAILED DESCRIPTION

In the discussion of various embodiments and aspects of the apparatus and method of this disclosure, examples of a processor may include any one or more of, for instance, a personal computer, portable computer, personal digital assistant (PDA), workstation, web-enabled mobile phone, WAP device, web-to-voice device, or other device. Further, examples of multimode or dual mode 3G/4G devices, e.g., CDMA EvDO/WiMAX or CDMA EvDO/LTE devices may include wireless phone handsets, smart phones, modems, laptop computers with embedded dual-mode functionality, mobile Internet devices such as used for video streaming, and other User Equipment (UE), for example.

Those with skill in the art will appreciate that the inventive concept described herein may work with various system configurations. In addition, various embodiments of this disclosure may be made in hardware, firmware, software, or any suitable combination thereof. Aspects of this disclosure may also be implemented as instructions stored on a machine-readable medium, which may be read and executed by one or more processors. A machine-readable medium may include any mechanism for storing or transmitting information in a form readable by a machine (e.g., a computing device, or a signal transmission medium), and may include a machine-readable transmission medium or a machine-readable storage medium. For example, a machine-readable storage medium may include read only memory, random access memory, magnetic disk storage media, optical storage media, flash memory devices, and others. Further, firmware, software, routines, or instructions may be described herein in terms of specific exemplary embodiments that may perform certain actions. However, it will be apparent that such descriptions are merely for convenience and that such actions in fact result from computing devices, processors, controllers, or other devices executing the firmware, software, routines, or instructions.

FIG. 1 depicts the architecture of a communications network 100 which may include one or more multimode/dual-mode 3G/4G devices 110 ("dual-mode device 110" or mobile station—"MS") implemented in accordance with various embodiments of this disclosure. For simplicity, only one multimode/dual-mode device 110 is illustrated, but it should be appreciated that the system and method of this disclosure are intended to apply to situations where there are multiple dual-mode devices throughout the coverage areas. Multimode/dual-mode device 110 may be configured to operate in either WiMAX or LTE networks, as well as in legacy 3G networks such as EvDO. Accordingly, multimode/dual-mode device 110 may be either CDMA EvDO-WiMAX or CDMA EvDO-LTE device.

In FIG. 1, a variety of 4G Base Transceiver Stations or Base Stations ("BS") (e.g., 4G BS 120a-120c, or 120), with associated 4G coverage areas 101a-101c, e.g., WiMAX or LTE coverage areas, and 3G Base Transceiver Stations (3G BS 121a-121c, or 121), with associated 3G coverage areas 102a-102c, e.g., CDMA EvDO coverage areas, are depicted. Depending at least on the location of multimode/dual-mode device 110, i.e., in or out of 4G coverage overlap areas 103a-103e, one or more of the 4G and/or 3G base stations may be capable of communicating with one or more multimode/dual-mode devices 110. Also, depending on the signal strength observed by the device 110, one or more of 3G BS 121 may be added to the active (or available) set of the device 110. Although not specifically illustrated, it should be understood that 4G BS 120 and 3G BS 121 contain various processors and memory devices and peripherals which may be used to carry out some or all of the functionality described herein.

In one embodiment, the device 110 sends a DRC signal on a DRC channel of RL to a CDMA EvDO BS 121 (e.g., CDMA EvDO BS 121a which does not have DRCLock enabled) in the active set requesting the BS 121a to serve the device 110 with a certain data rate based on application priority or QoS requirements, or the user's subscribed data rate plan. The DRC signal may be implemented by a four-bit digital word, for example, to designate one of 16 transmission rates available in EvDO mode. The higher the DRC, the higher the MCS with which the CDMA EvDO BS 121 serves multimode/dual-mode device 110. The DRC may be selected based on the EvDO SINR (Signal-to-Interference-Ratio) that depicts the signal strength received by the device from the CDMA EvDO BS 121a. On the other hand, the serving CDMA EvDO BS 121a may monitor the signal quality, e.g. based on an erasure rate, on the DRC channel and if the signal quality received by the CDMA EvDO BS 121a is below a certain, e.g. SNR value, the BS 121a may enable DRCLock on the DRCLock channel of the FL to indicate that the device 110 should temporarily stop sending DRC requests to that CDMA EvDO BS 121a for a fixed period of time, e.g., 30, 60 or 120 seconds. Even though the sector of the CDMA EvDO BS 121a is temporarily disabled for communication with the device 110, the CDMA EvDO BS 121a remains in the active set of the device 110. And, while the DRCLock for BS 121a is enabled, the device 110 may send DRC requests to other CDMA EvDO BS 121 in its active set, e.g. to CDMA EvDO BS 121b and BS 121c.

In FIG. 2, an exemplary embodiment of dual-mode device 110 includes 3G transceiver 210 operatively connected to antenna 215, and 4G transceiver 220, operatively connected to antenna 225. Alternative arrangements using a single antenna for both service types are possible. Baseband processing module 230 is configured to convert radio frequency (RF) signals from 3G transceiver 210 and 4G transceiver 220 to baseband signals. Processor 240 may represent one or more processors configured to execute various functionality associated with processing of information received and/or transmitted from antennas 215 and/or 225, including processing of information to determine the necessity and/or desirability of triggering a transition from 3G to 4 G operation.

Memory 250 may be configured to store various data and program instructions, and may include structured database 255 configured to store data that identifies active and/or available 3G sectors and a threshold number to initiate transition from 3G to 4 G operation.

Input/output controller 260 may operate in conjunction with user interface 270 to allow display of information to a user, for example, as well as to receive input from the user using conventional input/output devices, among other purposes.

Multimode/dual-mode device 110 may be pre-provisioned with optional GPS receiver 280 which may be used in various ways, e.g., with pre-provisioned coverage map tables to allow a current position as reported by GPS to be used to determine the presence or absence of a 3G or 4G coverage area. Alternatively, or in addition, dual-mode device 110 may determine the presence of a 3G or 4G coverage area by conventional radio frequency (RF) sensing techniques. In a further alternative embodiment, 3G and 4G coverage map tables may be pre-provisioned in 4G BS 120 and/or 3G BS 121.

In one or more embodiments, a multi-technology handoff may be employed by, for example, a properly programmed processor, e.g., processor 240. One assumption is that the network comprises of a mix of 3G and 4G base stations, and device 110 is in a coverage overlap area with acceptable 3G and 4G network access, e.g., one of the cross-hatched areas 103a-103e in FIG. 1. Another assumption is that, if a data transfer or communication is ongoing between device 110 and a 3G BS 121, the device 110 would not be forcibly handed off to a 4G BS 120 except may be as a result of the handoff algorithm illustrated in FIG. 3 and as described in detail below.

In one or more embodiments, while in operation with a CDMA EvDO BS 121, e.g., EvDO BS 121c, multimode/dual-mode device 110 may determine the number of sectors of CDMA EvDO BS 121 in the active or available set (including total active or available sectors, M, e.g., M=6 sectors) of device 110 which have been temporarily disabled by their respective BS 121, e.g., by enabling DRCLock. Device 110 may then determine if the number of temporarily-disabled sectors (e.g., N temporarily-disabled sectors, e.g., N=3 sectors) in the active set is equal to or greater than a threshold number (e.g., threshold, T=2). Alternatively, device 110 may determine if the ratio of the number of temporarily-disabled sectors in the active set to the total number of sectors in the active set (i.e., N/M) is equal to or greater than a threshold number (e.g., threshold, T=0.4). The threshold number may be pre-provisioned in the multimode/dual-mode device 110, and may be reprogrammed when device 110 is not engaged in a call with any network (i.e., 4G, 3G or CDMA network).

The ratio N/M, if at least equal to the threshold T may indicate the substantial likelihood of service performance degradation or complete loss in the event that the rest of the active set sectors also become unavailable. The active set sectors which do not yet have their DRCLock enabled may become temporarily-disabled if device 110 transiently experiences poor channel conditions, or may be dropped out of the active set due to degrading channel conditions for an extended time period. Based on such indication of possible performance degradation, multimode/dual-mode device 110 may initiate scans for a new available 3G sector on 3G BS 121 and/or a 4G sector on 4G BS 120 for handoff as described in detail below.

In one embodiment, the handoff trigger may be based on a user priority which may be determined by application QoS or user's subscribed rate plan. For example, real-time applications such as live video streaming, videoconferencing, etc. may be assigned the highest application QoS category and therefore, may correspond to the highest user priority for handoff consideration. Applications of lesser relative importance or with less stringent data latency requirements may be assigned lower application QoS categories and therefore, may correspond to lower user priority for handoff. In a similar manner, the most expensive rate plan from a wireless carrier for the usage of 3G/4G network 100 may be assigned the highest user priority and relatively less expensive plans may be assigned lower user priorities for handoff.

If multimode/dual-mode device 110 determines that the number of temporarily-disabled sectors of the active set is less than the threshold number, device 110 may continue operation in 3G mode with the already-engaged CDMA EvDO BS 121, i.e., CDMA EvDO BS 121c in this case. However, if it is determined that the number of temporarily-disabled sectors is equal to or greater than the threshold number, device 110 may initiate a scan for a new available or active CDMA EvDO sector of CDMA EvDO BS 121 to be added to its active set. The addition of a new CDMA EvDO sector to the active set may be based either on the frequency of the new CDMA EvDO sector, the signal strength (based, e.g., on a SNR value) of the new sector as received by device 110, or both. The scan for a new CDMA EvDO sector may be done for a configurable period of time, e.g., 10 seconds. Responsive to the determination of the number being equal to or greater than the threshold number, multimode/dual-mode device 110 may also initiate a scan for a 4G sector provided by 4G BS 120 (on the 4G WiMAX or LTE network) as a trigger to transition from 3G to 4G mode of operation. Multimode/dual-mode device 110 may initiate the scan for a new CDMA EvDO sector before initiating the scan for a 4G sector. Alternatively, device 110 may initiate the scan for a new CDMA EvDO sector in tandem (or in parallel) with the scan for a 4G sector.

In one embodiment, before expiration of the time period for scanning for a new CDMA EvDO sector, a CDMA EvDO sector fulfilling the above-discussed criteria is found and is added to the device 110 active set. In another embodiment, before expiration of the time period for scanning for a new CDMA EvDO sector, one or more of the temporarily-disabled sectors in the active set becomes enabled (or available), e.g., due to disabling of DRCLock by their respective CDMA EvDO BS 121. Both these embodiments may result in changing the proportion of temporarily-disabled and enabled sectors in the active set. As a result, multimode/dual-mode device 110 may reassess if the number or the ratio of the temporarily-disabled sectors in the active set is equal to or greater than the threshold number. Accordingly, depending upon the reassessment, device 110 will reenter the cycle of the scanning for a new 3G or 4G sector (to handoff) or continuing operation with a CDMA EvDO BS 121 in the 3G network.

However, if before the time period for the scanning of a new CDMA EvDO sector expires without a new 3G sector being found and if no temporarily-disabled sector reverses its state (e.g., due to reversal of DRCLock state), multimode/dual-mode device 110 may scan (or in the case of "tandem" scanning, continue to scan) for one or more 4G sectors of 4G BS 120 to trigger the transition of operation from 3G to 4G mode.

In one embodiment, a criterion to consider a 4G sector for handoff may be based on the channel quality indicator (CQI) values of 4G (e.g., WiMAX or LTE) networks that indicate a measure of channel quality of a given 4G wireless channel. A CQI for a wireless channel can be computed by making use of a performance metric, such as a signal-to-noise ratio (SNR), e.g., a carrier-to-interference noise ratio (CINR). CINR depicts the signal strength received by the 4G device, e.g., multimode/dual-mode device 110 from the 4G BS 120. In 46 mode, dual-mode device 110 sends a CQI based on the received CINR, which the 4G BS 120 BS translates to a data rate. Therefore, for a successful handoff, the 4G sector considered for transition (from 3G BS 121 to 4G BS 120) may have a CQI value (or values) which can be "mapped" to provide a data rate comparable to that corresponding to the DRC index of the 3G sector with which the multimode/dual-mode device 110 is currently in communication. Accordingly, once a 4G sector is found based on the CQI-DRC mapping, a handoff is made to the corresponding 4G BS 120. If such a 4G sector is not identified, multimode/dual-mode device 110 continues to operate with 3G BS 121 and reassess the state of the temporarily-disabled 3G sectors in the active set while in communication with the 3G BS 121.

In another embodiment, a 4G sector arbitrarily chosen from the set of all available 4G sectors on the 4G BS 120, regardless of the data rate provided by the chosen 4G sector, may be selected as the 4G sector to process handoff.

Turning now to FIG. 3, the exemplary flowchart of process 300 illustrates a generalized embodiment of the process described above in which it is assumed that multimode/dual-mode device 110 is in overlapping 3G and 4G coverage areas, e.g., overlapping coverage area 103d and that if a data transfer or communication is ongoing between device 110 and a 3G BS 121, e.g., 3G BS 121c, the device 110 would not be handed off to a 4G BS 120 except by the handoff process described below. It should be understood that the method described below is equally applicable for 3G, i.e. CDMA EvDO to WiMAX and CDMA EvDO to LTE handoff.

At step 310, multimode/dual-mode device 110 may be in communication with a CDMA EvDO BS 121 (e.g., BS 121c) engaged, e.g., in a real-time video streaming application. In one embodiment, multimode device 110 executes or continues with process 300 further based on a user priority which may be determined by application QoS or user's subscribed rate plan. For example, if device 110 is currently supporting an application of the highest application QoS category, e.g., including real-time applications such as live video streaming, videoconferencing, etc., device 110 may continue with process 300 with the highest user priority. Applications of lesser relative importance or with less stringent data latency requirements may be assigned lower application QoS categories and therefore, may correspond to lower user priority associated with device 110 for process 300. In the similar manner, the most expensive rate plan from a wireless carrier for the usage of 3G/4G network 100 may be assigned the highest user priority and relatively less expensive plans may be assigned lower user priorities with regard to process 300.

At step 312, multimode/dual-mode device 110 determines using, e.g., processor 240, the number of sectors of CDMA EvDO BS 121 in the active or available set (including total active or available sectors, e.g., M=6 sectors) of device 110 which have been temporarily disabled by their respective CDMA EvDO BS 121, e.g., by enabling DRCLock on BS 121 FL. Data corresponding to the active or available sector set of multimode/dual-mode device 110 may be stored in database 255 residing, e.g., in memory 250.

At step 314, multimode/dual-mode device 110 then determines if the number of temporarily-disabled sectors (e.g., N temporarily-disabled sectors, where N=3, for example) determined at step 312 is equal to or greater than a threshold number (threshold, T=2, for example). Alternatively, at step 314, device 110 determines if the ratio of the number of temporarily-disabled sectors in the active set to the total number of sectors in the active set (i.e., N/M=0.5, for example) is equal to or greater than a threshold number (e.g., threshold, T=0.4). Data identifying the threshold number may be pre-provisioned in the multimode/dual-mode device 110 and stored in database 255. The threshold number may be reprogrammed only when device 110 is not engaged in a call with any network (i.e., 4G, 3G or CDMA network).

If it is determined at step 314 that the number, e.g., absolute number, N or a ratio, N/M, associated with the temporarily-disabled sectors of the active set is less than the threshold number, T (i.e., response "NO" at step 314), device 110 continues operation in 3G mode with the already-engaged CDMA EvDO BS 121, i.e., CDMA EvDO BS 121c at step 316. Accordingly, multimode/dual-mode device 110 may reenter process 300 at step 312 of determining the number of temporarily-disabled sectors, N in the active or available set of device 110 and further continues in process 300 accordingly.

However, if it is determined at step 314 that the number associated with the temporarily-disabled sectors of the active set is equal to or greater than the threshold number (i.e., response "YES" at step 314), at step 318, device 110 may initiate a scan using, for example processor 240 for a new available or active CDMA EvDO sector of CDMA EvDO BS 121 to be added to its active set. The addition of a new CDMA EvDO sector to the active set may be based either on the frequency of the new CDMA EvDO sector, the signal strength (based, e.g., on a SNR value) of the new sector as received by multimode/dual-mode device 110, or both. The scan for a new CDMA EvDO sector may be done for a fixed period of time, e.g., 10 seconds, or may be configured by a user through an interface with the processor 240.

Also, if the response is "YES" at step 314, multimode/dual-mode device 110 may also initiate a scan using, for example, processor 240 for a 4G sector provided by 4G BS 120, e.g., WiMAX or LTE BS 120b or 120c at step 320. This scan for a 4G sector indicates the triggering of handoff of device 110's existing communication from 3G BS 121 (e.g., 3G BS 121c) to a 4G BS 120 (e.g., 4G BS 120b or 4G 120c). In one embodiment, multimode/dual-mode device 110 initiates the scan for a new CDMA EvDO sector (step 318) before initiating the scan for a 4G sector (step 320). In another embodiment, multimode/dual-mode device 110 initiates the scan for a new CDMA EvDO (step 318) sector in tandem (or in parallel) with the scan for a 4G sector (step 320).

At step 322, it is determined whether before expiration of the time period of step 318, a CDMA EvDO sector fulfilling the above-discussed criteria has been identified and added to the device 110 active set. Alternatively, or in addition, it is determined whether before expiration of the time period of step 318, one or more of the temporarily-disabled sectors in the active set has been re-enabled (or have become re-available), e.g., due to disabling of DRCLock by their respective CDMA EvDO BS 121.

Both cases above may result in changing the proportion of temporarily-disabled and enabled sectors in the active set of device 110. Therefore, if the response at step 322 is positive (i.e., response "YES" at step 322), multimode/dual-mode device 110 reassesses at step 314 if the number associated with the temporarily-disabled sectors in the active set is equal to or greater than the threshold number. Accordingly, depending upon the reassessment, device 110 will reenter the cycle of the scanning for a new 3G or 4G sector (at steps 318 and 320) or continuing operation with a CDMA EvDO BS 121 in the 3G network (at step 316).

However, if the response at step 322 is negative (i.e., response "NO" at step 322), multimode/dual-mode device 110 may scan (or in the case of "tandem" scanning, continue to scan) at step 320 for one or more 4G sectors of 4G BS 120 to trigger the transition of operation from 3G to 4G mode.

At step 324, it is determined whether a 4G sector is available for handoff. In one embodiment, this determination is based on the assessment of whether CQI value of any of the candidate 4G sectors can be "mapped" to or provide a data rate at least comparable to that corresponding to the DRC index of the 3G sector with which the multimode/dual-mode device 110 is currently in communication. In another embodiment, a 4G sector arbitrarily selected from the set of all available 4G sectors on the 4G BS 120 is determined as the 4G sector for handoff.

If it is determined at step 324 that a suitable 4G sector is available for handoff (i.e., response "YES" at step 324), a handoff is made from 3G BS 121 (e.g., 3G BS 121c) to the corresponding 4G BS 120 (e.g., 4G BS 120b or 120c) for communication in 4G mode at step 326. The process then ends at step 328.

If such a 4G sector is not identified (i.e., response "NO" at step 324), multimode/dual-mode device 110 continues to operate with 3G BS 121 (at step 316), and reassess the state of the temporarily-disabled 3G sectors in the active set while in communication with the 3G BS 121 (at step 312).

Further, the above processes may be implemented as computer instructions embodied on a physical, tangible computer-readable medium which, when executed by a processor in multimode/dual-mode device 110, or in 4G BS 120 and 3G BS 121, carries out the functionality of the embodiments described above.

In addition, over-the-air provisioning of software updates and/or data updates from a base station to a device (or subscriber station) may be made along the lines of the embodiments discussed above.

Those with skill in the art will appreciate that the inventive concept described herein may work with various system configurations. In addition, various embodiments of this disclosure may be made in hardware, firmware, software, or any suitable combination thereof. As discussed above, various aspects of this disclosure may also be implemented as instructions stored on a machine-readable medium, which may be read and executed by one or more processors. A machine-readable medium may include any mechanism for storing or transmitting information in a form readable by a machine (e.g., a computing device). For example, a machine-readable storage medium may include read only memory, random access memory, magnetic disk storage media, optical storage media, flash memory devices, and others. Further, firmware, software, routines, or instructions may be described herein in terms of specific exemplary embodiments that may perform certain actions. However, it will be apparent that such descriptions are merely for convenience and that such actions in fact result from computing devices, processors, controllers, or other devices executing the firmware, software, routines, or instructions.

Various embodiments may be described herein as including a particular feature, structure, or characteristic, but every aspect or embodiment may not necessarily include the particular feature, structure, or characteristic. Further, when a particular feature, structure, or characteristic is described in connection with an embodiment, it will be understood that such feature, structure, or characteristic may be included in connection with other embodiments, whether or not explicitly described. Thus, various changes and modifications may be made to this disclosure without departing from the scope or spirit of the inventive concept described herein. As such, the specification and drawings should be regarded as examples only, and the scope of the inventive concept to be determined solely by the appended claims.

What is claimed is:

1. A method to operate a multimode third generation (3G) and fourth generation (4G) communications device capable of operating in either a 4G network or a 3G network when in an area with overlapping 3G and 4G coverage, the method comprising:

based on an assessment that a number associated with temporarily-disabled sectors of an available sector set of the multimode device is at least equal to a threshold number, scanning, using a processor, for a new available sector in the 3G network;

if, upon scanning, the new available sector is identified, reassessing, using the processor, whether the number is at least equal to the threshold number; and if, upon scanning, the new available sector is not identified initiating, using the processor, a scan for a sector in the 4G network to transfer communications operational at the multimode device from a 3G base station associated to a 4G base station wherein the available sector set of the multimode device is stored in a memory operatively coupled to the processor, while the multimode device is operational with the 3G base station.

2. The method of claim 1, wherein the 4G base station provides data rate at least equal to the data rate provided by the 3G base station.

3. The method of claim 1, wherein the number associated with the temporarily-disabled sectors is a ratio of a number of temporarily-disabled sectors of the available sector set to the total number of sectors in the available sector set.

4. The method of claim 1, wherein the multimode device comprises a dual-mode CDMA/EvDO-LTE device.

5. The method of claim 1, wherein the 3G base station comprises a CDMA/EvDO base station.

6. The method of claim 1, wherein said scanning is performed for a certain fixed time period, and the new available sector is added in the available sector set.

7. The method of claim 1, wherein the 4G base station comprises an LTE base station.

8. The method of claim 1, wherein the temporarily-disabled sectors are disabled by the 3G base station by enabling Data Rate Control Lock (DRCLock).

9. A multimode communications apparatus capable of operating in either a 3G network or a 4G network when in an area with overlapping 3G and 4G coverage, the apparatus comprising:
- a 3G transceiver configured to transmit and receive information over a 3G network;
- a 4G transceiver configured to selectively transmit and receive data over a 4G network;
- a memory device configured to store an available sector set associated with the 3G transceiver, while the apparatus is in communication with a 3G base station in the 3G network; and
- a processor operatively coupled to the memory device, the 3G transceiver and the 4G transceiver, wherein the processor is configured to:
  - based on an assessment that a number associated with temporarily-disabled sectors of an available sector set of the multimode device is at least equal to a threshold number, scan for a new available sector in the 3G network,
  - if, upon scanning, the new available sector is identified, reassess whether the number is at least equal to the threshold number, and
  - if, upon scanning, the new available sector is not identified, initiate a scan for a sector in the 4G network to transfer communications operational at the multimode apparatus from the 3G base station associated to a 4G base station.

10. The apparatus of claim 9, wherein the number associated with the temporarily-disabled sectors is a ratio of a number of temporarily-disabled sectors of the available sector set to the total number of sectors in the available sector set.

11. The apparatus of claim 9, wherein the multimode apparatus is configured as a dual-mode CDMA/EvDO-LTE device.

12. The apparatus of claim 9, wherein the 3G base station comprises a CDMA/EvDO base station.

13. The apparatus of claim 9, wherein the 4G base station comprises an LTE base station.

14. The apparatus of claim 9, wherein the processor is configured to scan for a certain fixed time period, and add the new available sector to the available sector set.

15. A non-transitory computer-readable medium comprising computer readable code physically embodied thereon which, when executed by a processor arranged in a multimode third generation (3G) and fourth generation (4G) communications device capable of operating in either a 4G network or a 3G network when in an area with overlapping 3G and 4G coverage, causes the processor to carry out operations comprising:
- based on an assessment that a number associated with temporarily-disabled sectors of an available sector set of the multimode device is at least equal to a threshold number, scanning for a new available sector in the 3G network;
- if, upon scanning, the new available sector is identified, reassessing whether the number is at least equal to the threshold number; and
- if, upon scanning, the new available sector is not identified, initiating a scan for a sector in the 4G network to transfer communications operational at the multimode apparatus from a 3G base station associated to a 4G base station,
- wherein the available sector set of the multimode device is stored in a memory operatively coupled to the processor, while the multimode device is operational with the 3G base station.

16. The computer-readable medium of claim 15, wherein the number associated with the temporarily-disabled sectors is a ratio of a number of temporarily-disabled sectors of the available sector set to the total number of sectors in the available sector set.

17. The computer-readable medium of claim 15, wherein the multimode device comprises a dual-mode CDMA/EvDO-LTE device.

18. The computer-readable medium of claim 15, wherein the 3G base station comprises a CDMA/EvDO base station.

19. The computer-readable medium of claim 15, wherein the 4G base station comprises an LTE base station.

20. The computer-readable medium of claim 15, wherein said scanning is performed for a certain fixed time period, and the new available sector is added to the available sector set.

* * * * *